(12) United States Patent
Kang

(10) Patent No.: US 11,079,642 B2
(45) Date of Patent: Aug. 3, 2021

(54) DISPLAY PANEL AND DISPLAY DEVICE

(71) Applicants: HKC CORPORATION LIMITED, Guangdong (CN); CHONGQING HKC OPTOELECTRONICS TECHNOLOGY CO., LTD., Chongqing (CN)

(72) Inventor: Chihtsung Kang, Guangdong (CN)

(73) Assignees: HKC CORPORATION LIMITED, Shenzhen (CN); CHONGQING HKC OPTOELECTRONICS TECHNOLOGY CO., LTD, Chongqing (CN)

( * ) Notice: Subject to any disclaimer, the term of this patent is extended or adjusted under 35 U.S.C. 154(b) by 0 days.

(21) Appl. No.: 16/982,794

(22) PCT Filed: Feb. 26, 2019

(86) PCT No.: PCT/CN2019/076169
§ 371 (c)(1),
(2) Date: Sep. 21, 2020

(87) PCT Pub. No.: WO2020/155253
PCT Pub. Date: Aug. 6, 2020

(65) Prior Publication Data
US 2021/0003898 A1 Jan. 7, 2021

(30) Foreign Application Priority Data

Jan. 30, 2019 (CN) .......................... 201910097770.5

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136213* (2013.01); *G02F 2201/123* (2013.01)

(58) Field of Classification Search
CPC .................................................... G02F 1/1368
See application file for complete search history.

(56) References Cited

U.S. PATENT DOCUMENTS 5,339,181 A * 8/1994 Kim .................. G02F 1/136213
349/38
6,014,191 A 1/2000 Kim et al.
(Continued)

FOREIGN PATENT DOCUMENTS

| CN | 101738804 A | 6/2010 |
| CN | 101770125 A | 7/2010 |

(Continued)

OTHER PUBLICATIONS

Chinese Office Action, dated Apr. 22, 2020, for HKC Corporation Limited et al., Chinese Application No. 201910097770.5, filed Jan. 30, 2019.

(Continued)

*Primary Examiner* — Sang V Nguyen
(74) *Attorney, Agent, or Firm* — Law Offices of Albert Wai-Kit Chan, PLLC

(57) ABSTRACT

The present disclosure provides a display panel, which includes a plurality of data lines, a plurality of scan lines, and a plurality of pixels, a main scan electrode and a branch scan electrode of the same scan line are electrically connected, and a pixel electrode partially overlaps the branch scan electrode to form a storage capacitance.

5 Claims, 8 Drawing Sheets

(56) References Cited

U.S. PATENT DOCUMENTS

| | | | | |
|---|---|---|---|---|
| 6,421,038 B1* | 7/2002 | Lee | ................. | G09G 3/3677 |
| | | | | 345/87 |
| 2014/0036186 A1 | 2/2014 | Wang et al. | | |
| 2020/0126502 A1* | 4/2020 | Takeuchi | ............ | G09G 3/3696 |

FOREIGN PATENT DOCUMENTS

| | | | |
|---|---|---|---|
| CN | 101887897 A | 11/2010 | |
| CN | 102707526 A | 10/2012 | |
| CN | 102956214 A | 3/2013 | |
| CN | 104062781 A | 9/2014 | |
| CN | 104834132 A | 8/2015 | |
| CN | 105425435 A | 3/2016 | |
| CN | 109116641 A | 1/2019 | |
| CN | 109192170 A | 1/2019 | |
| JP | H09230387 A | 9/1997 | |
| JP | 1144893 A | 2/1999 | |
| JP | 2007034327 A | 2/2007 | |
| TW | 351464 U | 1/1999 | |
| TW | 446832 B | 7/2001 | |

OTHER PUBLICATIONS

International Search Report, dated Oct. 18, 2019, for HKC Corporation Limited et al., International Application No. PCT/CN2019/076169, filed Feb. 26, 2019.

Written Opinion of the International Search Authority, dated Oct. 18, 2019, for HKC Corporation Limited et al., International Application No. PCT/CN2019/076169, filed Feb. 26, 2019.

Chinese Office Action dated Feb. 19, 2021, for HKC Co., Ltd. et al., Chinese Application No. 201910097770.5, filed Jan. 30, 2019.

Notification to Grant Patent Right for Invention dated Mar. 31, 2021, for HKC Co., Ltd. et al., Chinese Application No. 201910097770.5, filed Jan. 30, 2019.

Supplementary Search Summary dated Jan. 29, 2021, for HKC Co., Ltd. et al., Chinese Application No. 201910097770.5, filed Jan. 30, 2019.

* cited by examiner

DISPLAY PANEL AND DISPLAY DEVICE

FIELD

The invention relates to the technical field of display, and in particular to a display panel and a display device.

BACKGROUND

In the display panel, pixels are charged by data signals on data lines to control the gray level of the pixels, thereby displaying certain images. As a parasitic capacitance is existed between a source electrode and a gate electrode of a switching component in the pixel, causing that changes of the scan signal on the scan line may be coupled to the pixel electrode through the parasitic capacitance, as such the potential of the pixel electrode changes, and a kick back phenomenon would occur, further causing a flicker of the display screen and degradation of the display quality. In order to maintain the potential of the pixel electrode in the pixel, a storage capacitance is also provided in the pixel, and the larger the storage capacitance, the better the potential retention effect in the pixel. However, the current storage capacitance is formed by a non-transparent common line or scan line and a transparent pixel electrode cooperatively, and the storage capacitance is changed by changing an overlap area between the scan line or common line and the pixel electrode. Correspondingly, with the increase of the required storage capacitance, aperture ratios of pixels would decrease, and the display brightness may decrease with the constant power consumption of the backlight source. In order to maintain the display brightness, the power consumption of the required backlight source may increase, resulting in a waste of energy.

SUMMARY

It is therefore one main object of the present disclosure to provide a display panel, so as to solve the problem that the aperture ratio of the pixel is reduced due to the increase of the storage capacitance of the pixel, and to reduce the flicker caused by backlash while ensure the aperture ratio of the pixel in the display panel, to improve the display effect.

In order to realize the above aim, the present disclosure provides a display panel, which includes a plurality of data lines, a plurality of scan lines, and a plurality of pixels, the scan line includes a main scan electrode and a branch scan electrode, the main scan electrode and the branch scan electrode of the same scan line are electrically connected, and at least a part of the branch scan electrodes extend along an extending direction of the data line and are adjacent to the data line, and the pixel includes a pixel electrode, the pixel electrode partially overlaps the branch scan electrode to form a storage capacitance.

In order to realize the above aim, the present disclosure further provides a display panel, which includes a plurality of data lines, a plurality of scan lines, and a plurality of pixels, the scan line includes a main scan electrode and a branch scan electrode, the main scan electrode and the branch scan electrode of the same scan line are electrically connected, and at least a part of the branch scan electrodes extend along an extending direction of the data line and are adjacent to the data line; and the pixel includes a pixel electrode, the pixel electrode partially overlaps the branch scan electrode to form a storage capacitance, one of the pixel electrodes partially overlaps two of the branch scan electrodes, and the two branch scan electrodes are respectively defined at two sides of the pixel electrode, the pixel electrode partially overlaps the branch scan electrode and/or the main scan electrode of a fore-stage scan line, or the pixel electrode partially overlaps the branch scan electrode and/or the main scan electrode of a post-stage scan line.

In order to realize the above aim, the present disclosure further provides a display device, the display device includes a display panel, the display panel includes a plurality of data lines, a plurality of scan lines, and a plurality of pixels, the scan line includes a main scan electrode and a branch scan electrode, the main scan electrode and the branch scan electrode of the same scan line are electrically connected, and at least a part of the branch scan electrodes extend along an extending direction of the data line and are adjacent to the data line, and the pixel includes a pixel electrode, the pixel electrode partially overlaps the branch scan electrode to form a storage capacitance.

In the technical solution of the present disclosure, the display panel includes a plurality of data lines, a plurality of scan lines, and a plurality of pixels, the scan lines includes a main scan electrode and a branch scan electrode, the main scan electrode and the branch scan electrode of the same scan line are electrically connected, and at least a part of the branch scan electrodes extend along an extending direction of the data line and are adjacent to the data line. The pixel includes a pixel electrode, the pixel electrode partially overlaps the branch scan electrode to form a storage capacitance. The space between the pixel electrode and the data line is fully utilized by arranging the branch scan electrode adjacent to the data line and forming a storage capacitance by the branch scan electrode and the pixel electrode. And the branch scan electrodes can also shield the interference of the data signals on the data lines to the potential of the pixel electrodes, so that the minimum distance between the pixel electrodes and the data lines can be further reduced, thus avoiding the sacrifice of the aperture ratio of the pixels, and even achieving the effect of increasing the aperture ratio by reducing the minimum distance between the pixel electrodes and the data lines. The increase of the aperture ratio reduces the power consumption of the required backlight source and helps to save energy. The size of the storage capacitance has a positive correlation with the overlap area between the pixel electrode and the branch scan electrode. By adjusting the overlap area between the pixel electrode and the branch scan electrode, the required storage capacitance can be obtained to reduce the backlash caused by the influence of the scan signal on the potential of the pixel electrode, the flicker phenomenon in the display screen is alleviated and the display effect is improved.

The realization, functional features and advantages of the purpose of this present disclosure will be further described with reference to the accompanying drawings in conjunction with the embodiments.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It is to be understood that, all of the directional instructions in the exemplary embodiments of the present disclosure (such as top, down, left, right, front, back . . . ) can only be used for explaining relative position relations, moving condition of the elements under a special form (referring to figures), and so on, if the special form changes, the directional instructions changes accordingly.

In addition, the descriptions, such as the "first", the "second" in the exemplary embodiment of present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, the "and/or" in the present disclosure means including three paratactic solutions, for example, taking "A and/or B" as an example, the "A and/or B" includes A solution, B solution, or solution of A and B. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

Figure 1:
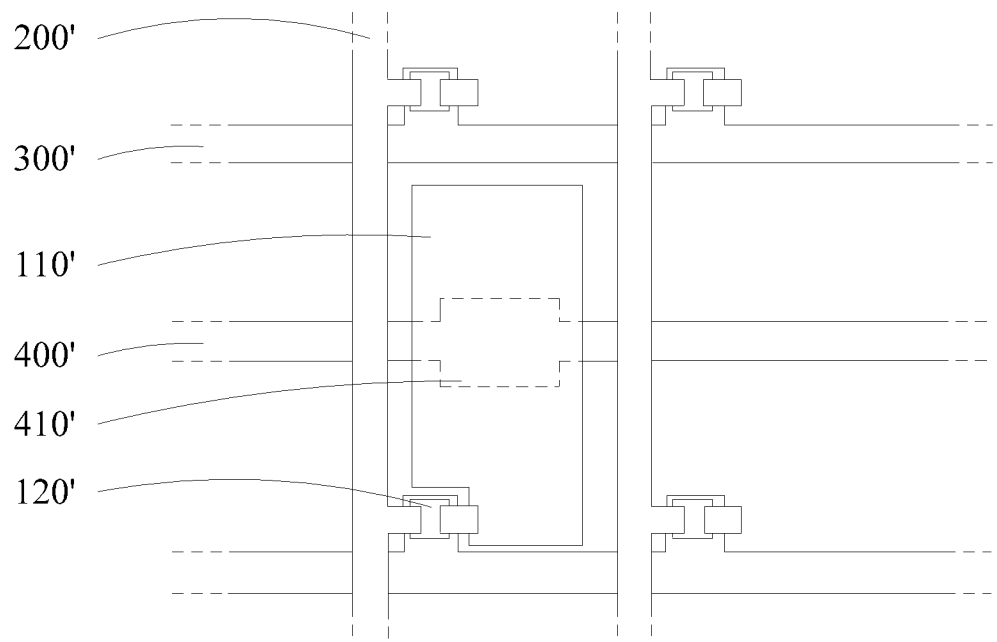
FIG. 1 is a structural diagram of an exemplary display panel.
Figure 2:
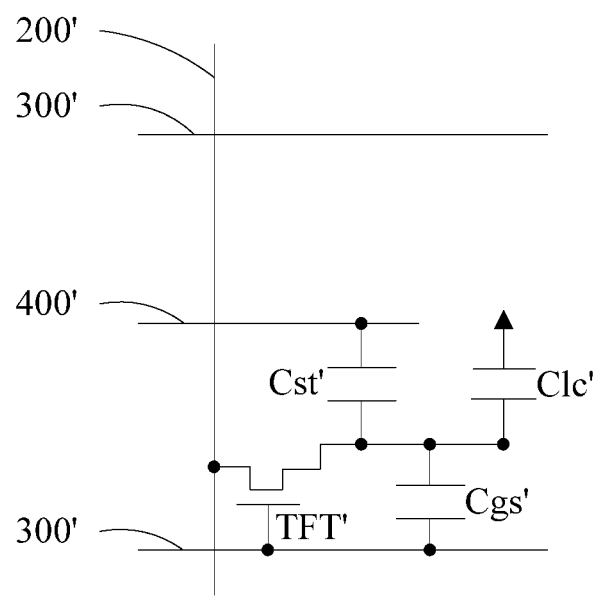
FIG. 2 is a circuit structure diagram of the display panel in FIG. 1.
Figure 3:
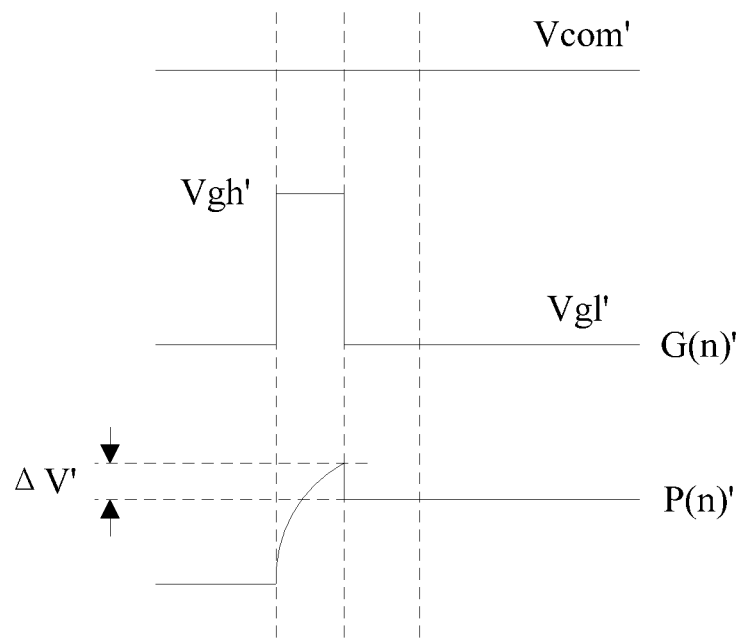
FIG. 3 is a signal timing diagram of the display panel in FIG. 1.

FIG. 1 is a structural diagram of an exemplary display panel, the display panel includes a plurality of pixels (FIG. 1 shows one pixel and its surrounding data lines and scan lines), a plurality of data lines 200', a plurality of scan lines 300' and a plurality of common lines 400'. Among them, the pixels are generally arranged in a rectangular array, and the pixel include a pixel electrode 110' and a switching component 120'. The switching component 120' is usually defined as a thin film transistor TFT' which controls the data line to charge the corresponding pixel under the action of the scan signal on the scan line. Generally, the display panel includes three kinds of pixels: red pixel, green pixel and blue pixel. At least one red pixel, one green pixel and one blue pixel form a pixel group to display a color image according to the principle of spatial color mixing. The pixel generates a certain display gray scale under the combined action of the scan signal G(n)' on the scan line 300' and the data signal on the data line 200'. In order to maintain the potential on the pixel electrode 110' to maintain the display effect, the common line 400' includes the common electrode 410', and the pixel electrode 110' at least partially overlaps the common electrode 410' to form a storage capacitance. In FIG. 1, the common electrode 410' overlaps a portion of the pixel electrode 110' to form a storage capacitance. FIG. 2 is a circuit structure diagram of the display panel in FIG. 1, Cst' is the storage capacitance of the pixel, i.e., the capacitance formed between the common electrode 410' and the pixel electrode 110', Clc' is the liquid crystal capacitance of the pixel, and Cgs' is the parasitic capacitance between the source electrode and the gate electrode of the switching component 120' in the pixel. FIG. 3 is a signal timing diagram of the display panel in FIG. 1, Vcom' is the level of the common signal on the common line 400', Vgh' is the high level of the scan signal G(n)' on the scan line 300', and Vgl' is the low level of the scan signal G(n)' on the scan line 300'. When the scan signal G(n)' is changed from the high level Vgh' to the low level Vgl', i.e. the scan line is changed from the on state to the off state, the pixel level P(n)' on the same stage pixel electrode 110' will change $\Delta V'$, FIG. 2 shows that: $\Delta V'=(Vgh'-Vgl')\times Cgs'/(Cgs'+Cst'+Clc')$.

Figure 4:
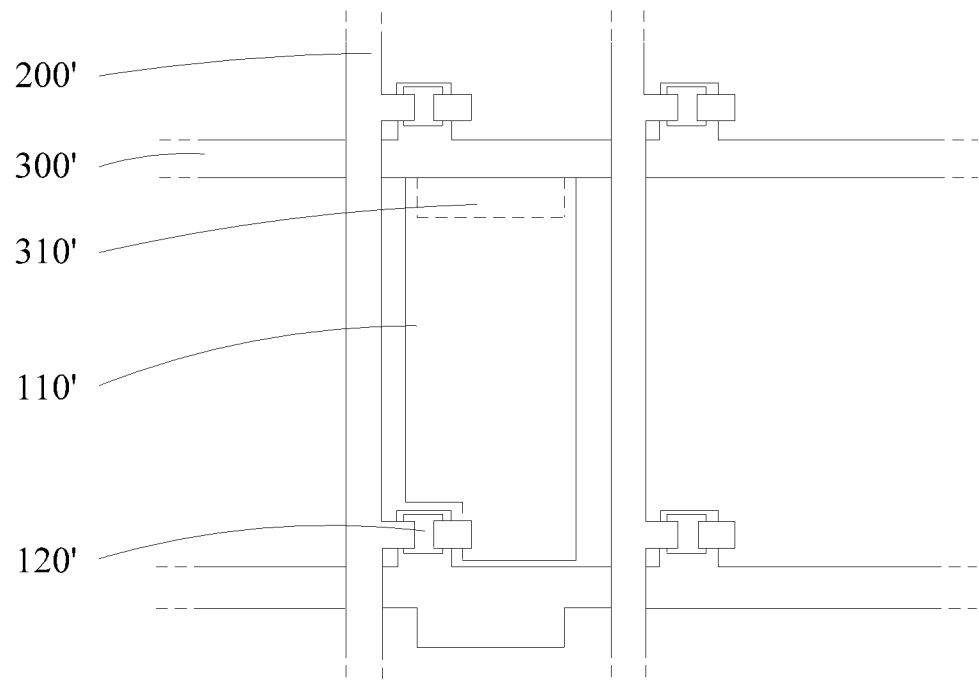
FIG. 4 is a structural diagram of another exemplary display panel.
Figure 5:
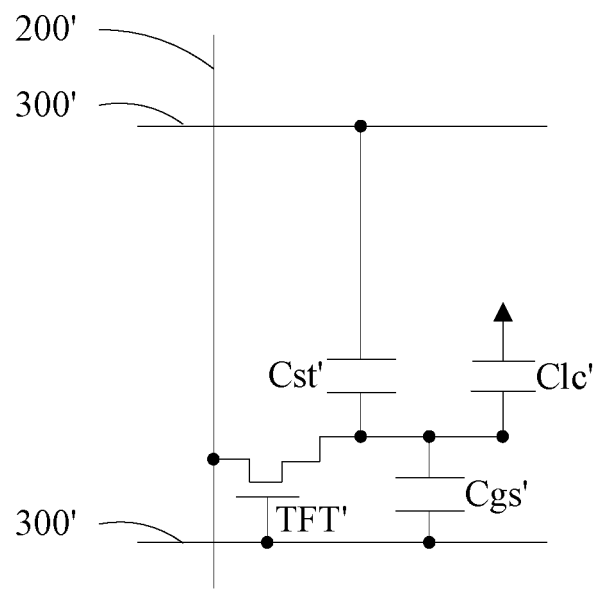
FIG. 5 is a circuit structure diagram of the display panel in FIG. 4.
Figure 6:
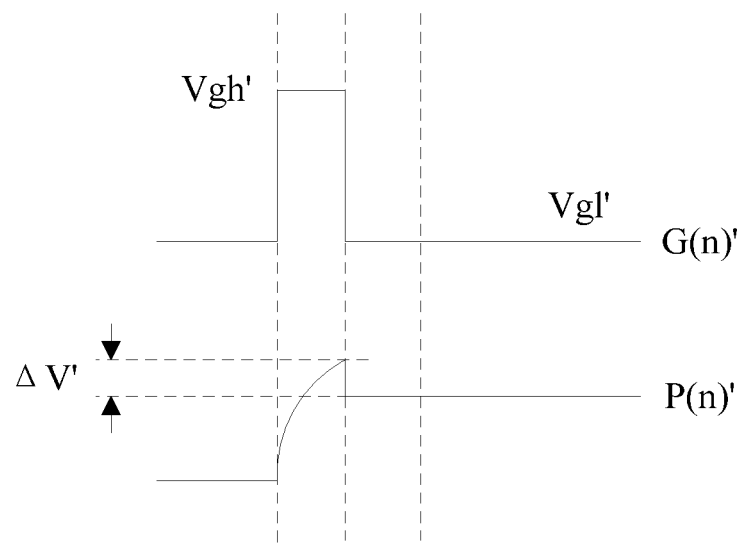
FIG. 6 is a signal timing diagram of the display panel in FIG. 4.

FIG. 4 is a structural diagram of another exemplary display panel. The display panel includes a plurality of pixels (FIG. 1 shows one pixel and its surrounding data lines and scan lines), a plurality of data lines 200' and a plurality of scan lines 300'. The pixel includes a pixel electrode 110' and a switching component 120'. The switching component 120' is defined as a thin film transistor TFT that controls the data lines to charge corresponding pixels under the action of scan signals on the scan lines. A part of the fore-stage scan line 300' extends toward the current stage pixel to form a scan electrode 310', the fore-stage scan line refers to a scan line adjacent to the current stage pixel and is electrically connected to the fore-stage pixel, and the pixel electrode 110' and the scan electrode 310' at least partially overlap to form a storage capacitance. In FIG. 4, the scan electrode 310' overlaps a portion of the pixel electrode 110' to form the storage capacitance. FIG. 5 is a circuit structure diagram of the display panel in FIG. 4, Cst' is the storage capacitance of the pixel, Clc' is the liquid crystal capacitance of the pixel, and Cgs' is the parasitic capacitance between the source electrode and gate electrode of the switching component 120' in the pixel. As shown in FIG. 6, when the scan signal on the scan line 300' changes from the high level Vgh' to the low level Vgl', i.e., the scan line changes from the on state to the off state, the change of the pixel level P(n)' on the pixel electrode 110' is $\Delta V'$, where $\Delta V'=(Vgh'-Vgl')\times Cgs'/(Cgs'+Cst'+Clc')$.

According to the above embodiment, in the display panel, in order to reduce the change of pixel level on the pixel electrode as much as possible, so as to reduce the flicker of the image in the display panel and improve the display effect, the storage capacitance should be increased as much as possible while other conditions remain unchanged. However, the storage capacitance is related to the overlap area of the pixel electrode and the common electrode, or the overlap area of the pixel electrode and the scan electrode. The larger the overlap area, the larger the storage capacitance Cst. On the other hand, considering that although the pixel electrode is usually made of transparent indium tin oxide (ITO), the scan electrode and the common electrode are usually made of non-transparent metal, in the embodiment shown in FIGS. 1 and 4, the non-transparent scan electrode and the common electrode may lead to a decrease in the light transmission area in the pixel, i.e., a decrease in the aperture ratio of the pixel, the overall brightness of the display panel also decreases, or the energy consumption of the required backlight source increases.

Figure 7:
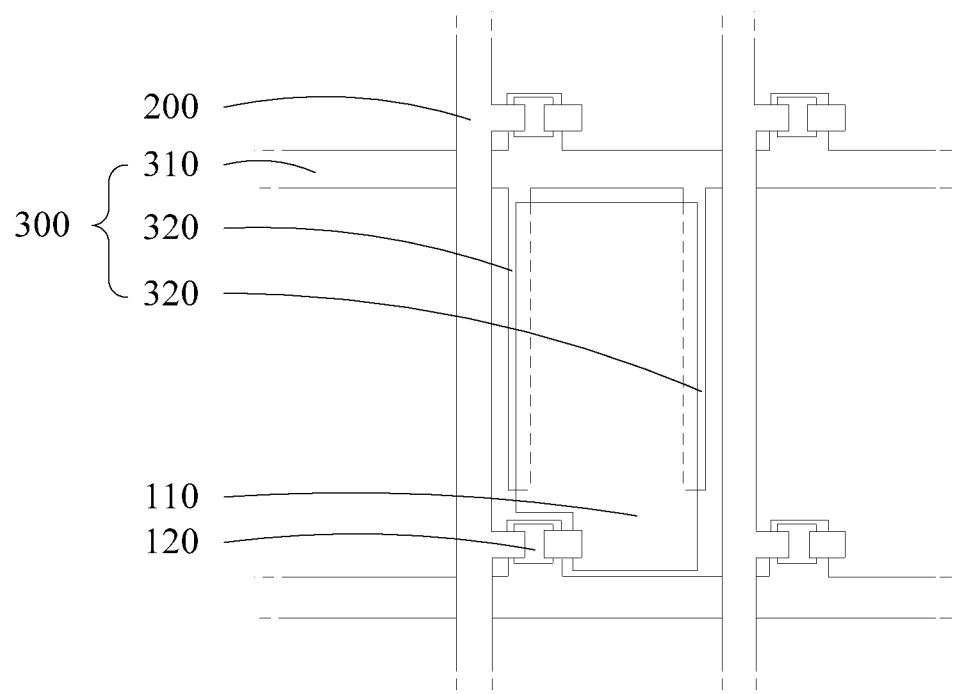
FIG. 7 is a structural diagram of the display panel according to an exemplary embodiment of the present disclosure.

The present disclosure provides a display panel, which aims to reduce the backlash of pixel level while maintaining pixel aperture ratio, so as to improve display effect. In an embodiment of the present disclosure, as shown in FIG. 7, the display panel includes a plurality of data lines 200, a plurality of scan lines 300 and a plurality of pixels, the scan lines 300 include a main scan electrode 310 and a branch scan electrode 320, the main scan electrode 310 and the branch scan electrode 320 of the same scan line 300 are electrically connected, and at least part of the branch scan electrodes 320 extend along an extending direction of the data lines 200 and are disposed adjacent to the data lines 200. The pixel includes a pixel electrode 110 that partially overlaps the branch scan electrode 320 to form a storage capacitance.

In the following, the technical solution of the present disclosure will be described in detail by taking the liquid crystal display panel as an example. As shown in FIG. 7, the data lines 200 may extend in the longitudinal direction of the display panel, and the plurality of data lines 200 are arranged in the lateral direction of the display panel. The scan line 300 includes the main scan electrode 310 and the branch scan electrode 320, the main scan electrode 310 may extend in the lateral direction of the display panel, and the plurality of main scan electrodes 310 may be arranged in the longitudinal direction of the display panel, the branch scan electrode 320 may extend partially in the longitudinal direction of the display panel, partially in the lateral direction, or the branch scan electrode 320 may extend in the longitudinal direction of the display panel as a whole, i.e., in the extending direction of the data lines, and the plurality of branch scan electrodes 320 may be arranged in the lateral direction of the display panel. The branch scan electrode 320 is arranged adjacent to the data line 200. Since the branch scan electrode 320 is usually made of metal, it can form a shield for the data signal on the data line 200, thereby reducing the interference of the data signal to the pixel level of the pixel electrode. The pixel includes the pixel electrode 110 partially overlapping with the branch scan electrode 320 to form the storage capacitance. When the overlap area of the pixel electrode 110 and the branch scan electrode 320 is larger, the storage capacitance is larger. Considering the shielding effect of the branch scan electrodes 320 on data signals, in the exemplary embodiment, the normal display effect can be ensured even if the distance between the pixel electrodes 110 and the data lines 200 is small Therefore, the pixel electrodes 110 can be extended towards the data lines 200 to increase the overlap area between the pixel electrodes 110 and the branch scan electrodes 320, thereby increasing the opening ratio of pixels while increasing the storage capacitance.

In the exemplary embodiment, the display panel includes the plurality of data lines 200, the plurality of scan lines 300 and the plurality of pixels, the scan lines 300 include the main scan electrode 310 and the branch scan electrode 320, the main scan electrode 310 and the branch scan electrode 320 of the same scan line 300 are electrically connected, and at least part of the branch scan electrodes 320 extend along the extending direction of the data lines 200 and are disposed adjacent to the data lines 200. The pixel includes the pixel electrode 110 that partially overlaps the branch scan electrode 320 to form the storage capacitance. The space between the pixel electrode 110 and the data line 200 is fully utilized by providing the branch scan electrode 320 adjacent to the data line 200 and forming the storage capacitance by the branch scan electrode 320 and the pixel electrode 110. And, the branch scan electrode 320 can also shield the interference of the data signal on the data line 200 to the potential of the pixel electrode 110, so that the minimum distance between the pixel electrode 110 and the data line 200 can be further reduced, thus avoiding the sacrifice of the aperture ratio of the pixel, and even achieving the effect of increasing the aperture ratio by reducing the minimum distance between the pixel electrode 110 and the data line 200. The increase of the aperture ratio reduces the power consumption of the required backlight source and helps to save energy. The size of the storage capacitance has a positive correlation with the overlap area between the pixel electrode and the branch scan electrode. By adjusting the overlap area between the pixel electrode and the branch scan electrode, the required storage capacitance can be obtained to reduce the backlash caused by the influence of the scan signal on the potential of the pixel electrode, the flicker phenomenon in the display screen is alleviated and the display effect is improved.

Figure 8:
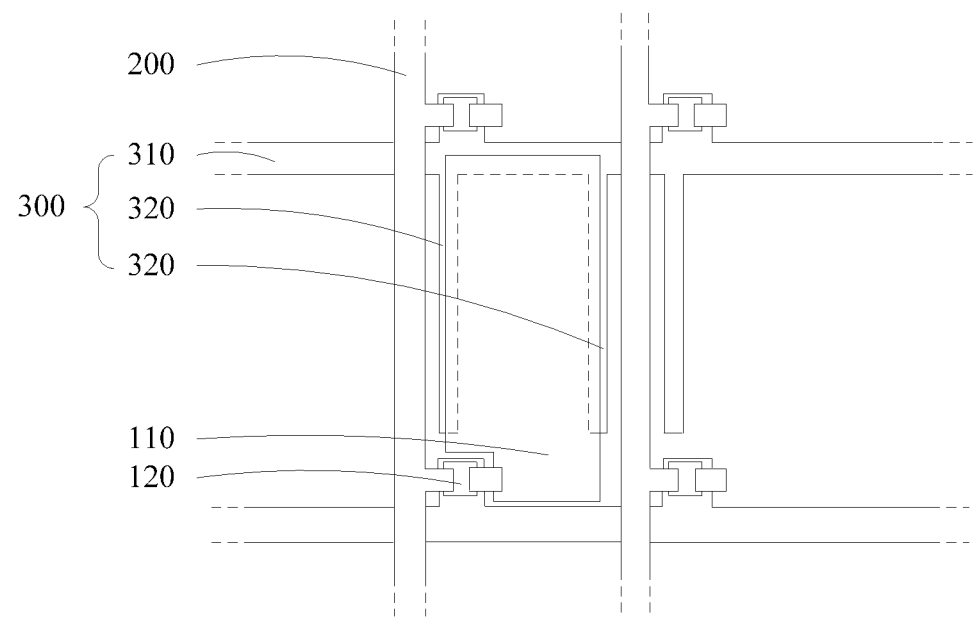
FIG. 8 is a structural diagram of the display panel according to another exemplary embodiment of the present disclosure.

In another exemplary embodiment of the present disclosure, as shown in FIG. 8, the pixel electrode 110 partially overlaps the main scan electrode 310 and the branch scan electrode 320 to form a storage capacitance. The pixel electrode 110 partially overlaps the main scan electrode 310 in addition to partially overlapping with the branch scan electrode 320, which helps to further increase the overlap area between the pixel electrode 110 and the scan line 300, thereby increasing the storage capacitance to reduce the back flushing of the pixel level on the pixel electrode and to avoid flicker of the display panel. Moreover, the pixel electrode 110 extends in the direction of the main scan electrode 320 to form an overlap area, furthermore, the aperture ratio of the pixels is increased, thereby making the display brightness of the display panel stronger or the power consumption of the required backlight source smaller to improve the display effect of the display panel.

As shown in FIGS. 7 and 8, one pixel electrode 110 partially overlaps two scan electrodes 320, which are arranged on two sides of the pixel electrode 110 respectively. First, the support scan electrodes 320 are provided on two sides of the pixel electrode 110, which helps to further increase the storage capacitance and avoid flickering of the display screen due to back flushing of the pixel level. Second, the branch scan electrodes 320 provided on two sides would not adversely affect the opening rate of the pixel, and the pixel electrodes 110 extend to the two sides, which is contribute to further increase the opening rate of the pixel. Third, one side of the branch scan electrode 320 is located between the pixel electrode 110 and the data line 200, which helps to enhance the shielding effect of the data signals on the data lines 200 at two sides of the pixel electrode 110, thereby making the pixel level on the pixel electrode 110 more stable and improving the display effect.

Figure 9:
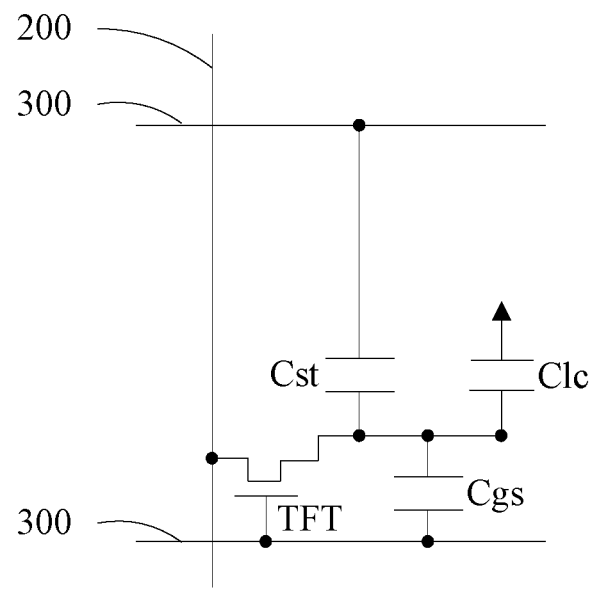
FIG. 9 is a circuit structure diagram of the display panel in FIGS. 7 and 8.

As shown in FIGS. 7 and 8, the pixel electrode 110 partially overlaps the branch scan electrode 320 and/or the main scan electrode 310 of the fore-stage scan line 300. By controlling the timing of the scan signal, the back flushing of the pixel level on the pixel electrode 110 can be reduced to avoid flickering of the display screen. FIG. 9 is a circuit structure diagram of the display panel in FIGS. 7 and 8, Cst is the storage capacitance formed by the pixel electrode 110 and the branch scan electrode 320 and/or the main scan electrode 310 of the scan line 300. The pixel also includes a switching component 120, the switching component 120 is normally defined as a thin film transistor TFT, the switching component 120 includes a source electrode, a drain electrode and a gate electrode, and Cgs is the parasitic capacitance formed between the source electrode and the gate electrode of the switching component. Clc is the liquid crystal capacitance of the pixel.

Figure 10:
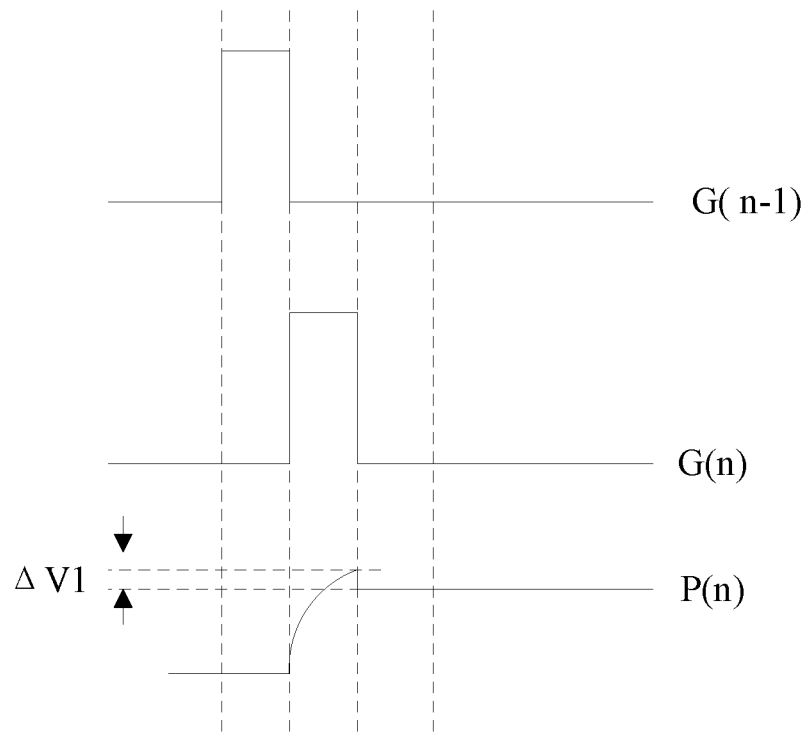
FIG. 10 is a signal timing diagram of the display panel shown in FIGS. 7 and 8 according to a specific exemplary embodiment.

As shown in FIG. 10, in an exemplary embodiment, the scan signals G(n) on the scan line include a high level Vgh and a first low level Vgl1 when the display panel is in an operating state, specifically when the pixel is charged, the high level Vgh is higher than the first low level Vgl1, and the high level falling edge of the scan signal G(n−1) on the fore-stage scan line synchronizes with the high level rising edge of the scan signal G(n) on the current-stage scan line. When the scan signal G(n) on the current-stage scan line is switched from the high level Vgh to the first low level Vgl1, that is, the current scan line controls the current pixel to switch from the on state to the off state, the change on the pixel electrode 110 of the current-stage pixel is ΔV1=(Vgh−Vgl)×Cgs/(Cgs+Cst+Clc). According to the above relationship, as the storage capacitance Cst increases, the smaller the pixel level change, that is, the weaker the backlash effect, and correspondingly, the better the display effect. Since the sum of the overlap areas between the pixel electrode 110 and the main scan electrode 10 and the branch scan electrode 320 is larger than the overlap area of the pixel electrode and the scan electrode or the common electrode in the example, in the exemplary embodiment, by increasing the storage capacitance, the change of the pixel level is effectively reduced and the phenomenon of image flicker in the display panel is alleviated. Moreover, the pixel electrode extends in the direction of the main scan electrode 310 and/or the branch scan electrode 320, while increasing the aperture ratio of the pixel.

Figure 11:
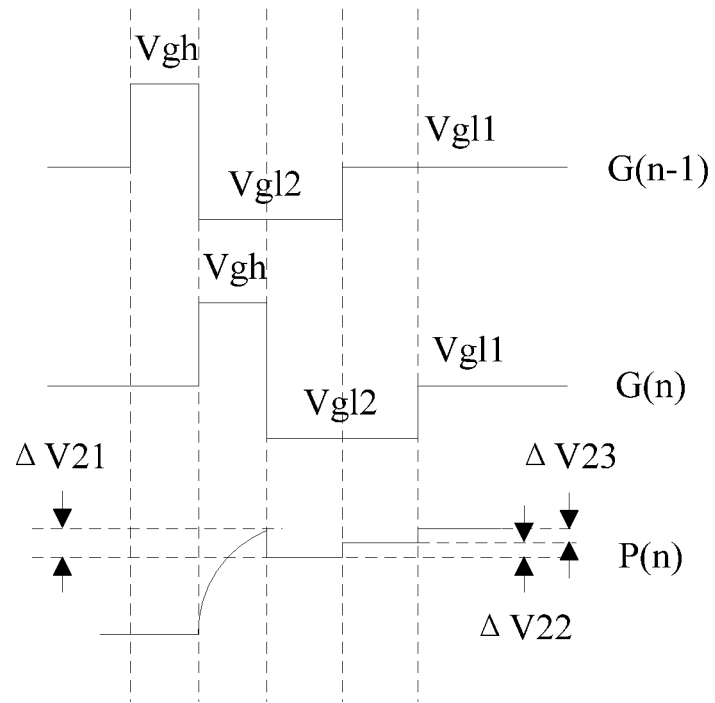
FIG. 11 is a signal timing diagram of the display panel shown in FIGS. 7 and 8 according to another specific exemplary embodiment.

In another specific example, as shown in FIG. 11, when the display panel is in an operating state, the scan signals on the scan line 300 include a high level Vgh, a first low level Vgl1 and a second low level Vgl2, the high level Vgh is higher than the first low level Vgl1, the first low level Vgl1 is higher than the second low level Vgl2, the second low level Vgl2 is located on the falling edge side of the high level, and the second duration of the second low level Vgl2 is twice of the first duration of the high level Vgh, a high level falling edge of the scan signal G(n−1) on the fore-stage scan line synchronizes with a high level rising edge of the scan signal G(n) on the current-stage scan line. When the current-stage scan signal G(n) is switched from the high level Vgh to the second low level Vgl2, that is, the current-stage is switched from the on state to the off state, the pixel level change on the pixel electrode of the current stage pixel is ΔV21=(Vgh−Vgl2)×Cgs/(Cgs+Cst+Clc). When the current-stage scan signal G(n−1) is converted from the second low level Vgl2 to the first low level Vgl1, a pixel level change of ΔV22=(Vgl2−Vgl1)×Cst/(Cgs+Cst+Clc) will occur on the pixel electrode of the current stage pixel. When the current stage scan signal G(n) is converted from the second low level Vgl2 to the first low level Vgl1, a pixel level change of ΔV23=(Vgl2−Vgl1)×Cgs/(Cgs+Cst+Clc) will occur on the pixel electrode of the current stage pixel. In order to minimize the back flash effect and keep the display screen as stable as possible, it can be seen from FIG. 11 that ΔV21, ΔV22, and ΔV23 should satisfy that: ΔV21+ΔV22+ΔV23=0, i.e. the storage capacitance Cst=(Vgh−Vgl1)×Cgs/(Vgl1−Vgl2). In this example, the storage capacitance can satisfy the above relationship by changing the overlap area between the pixel electrode 110 and the scan line 300 to achieve a better display effect.

Figure 12:
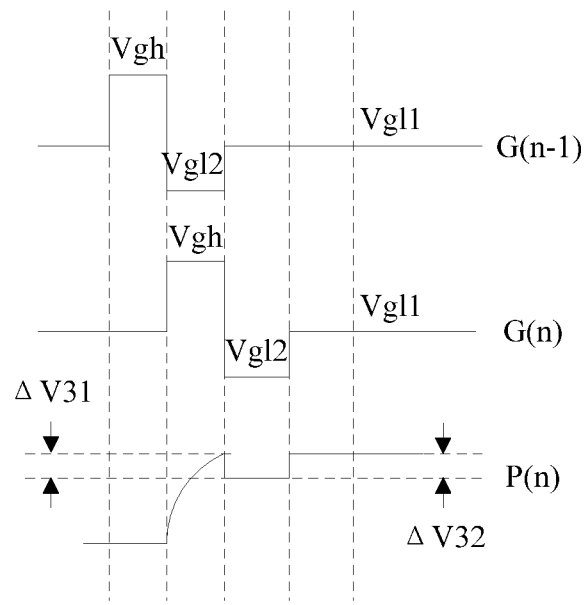
FIG. 12 is a signal timing diagram of the display panel shown in FIGS. 7 and 8 according to a further specific exemplary embodiment.

In another specific example, as shown in FIG. 12, when the display panel is in the running state, the scan signals on the scan line include a high level Vgh, a first low level Vgl1 and a second low level Vgl2, the high level Vgh is higher than the first low level Vgl1, the first low level Vgl1 is higher than the second low level Vgl2, the second low level Vgl2 is located on the falling edge side of the high level Vgh, and the second duration of the second low level Vgl2 is equivalent to the first duration of the high level Vgl2, and the high level falling edge of the scan signal G(n−1) on the fore-stage scan line synchronizes with the high level rising edge of the scan signal G(n) on the current-stage scan line. When the fore-stage scan signal G(n−1) is converted from the second low level Vgl2 to the first low level Vgl1 and the current-stage scan signal G(n) is converted from the high level Vgh to the second low level Vgl2, the pixel level change generated on the pixel electrode 110 of the current stage pixel is ΔV31=(Vgl2−Vgl1)×Cst/(Cgs+Cst+Clc)+(Vgh−Vgl2)×Cgs/(Cgs+Cst+Clc), where the first term corresponds to the pixel level change of the fore stage scan signal G(n−1) switching from the second low level Vgl2 to the first low level Vgl1, the second term corresponds to the pixel level change of the current stage scan signal G(n) switching from the high level Vgh to the second low level Vgl2. When the current stage scan signal G(n) is switched from the second low level Vgl2 to the first low level Vgl1, the pixel level change generated on the pixel electrode of the current stage pixel can be ΔV32=(Vgl2−Vgl1)×Cgs/(Cgs+Cst+Clc). In order to minimize the back flash effect, ΔV31 and ΔV31 should satisfy that ΔV31+ΔV32=0, i.e. the storage capacitance Cst should satisfy Cst=(Vgh−Vgl1)×Cgs/(Vgl1−Vgl2). In the exemplary embodiment, the storage capacitance can satisfy the above relationship by changing the overlap area between the pixel electrode 110 and the scan line 300 to achieve a better display effect.

Figure 13:
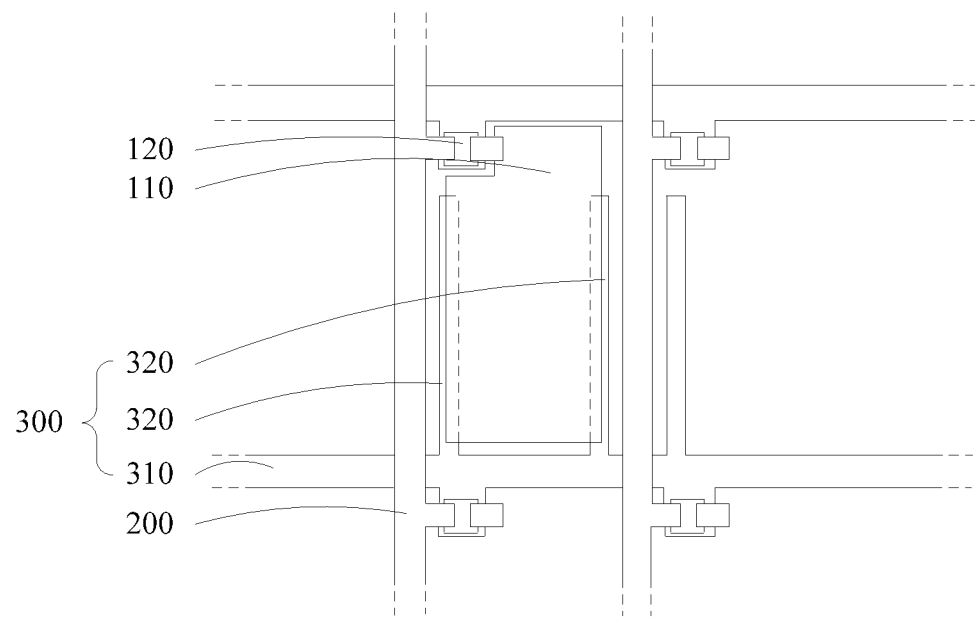
FIG. 13 is a structural diagram according to another exemplary embodiment of the present disclosure.

In another exemplary embodiment of the present disclosure, as shown in FIG. 13, the pixel electrode 110 partially overlaps the branch scan electrode 320 of the post-stage scan line 300 to form a storage capacitance, the post-stage scan line refers to a scan line adjacent to the current stage pixel and is electrically connected to the post-stage pixel.

Figure 14:
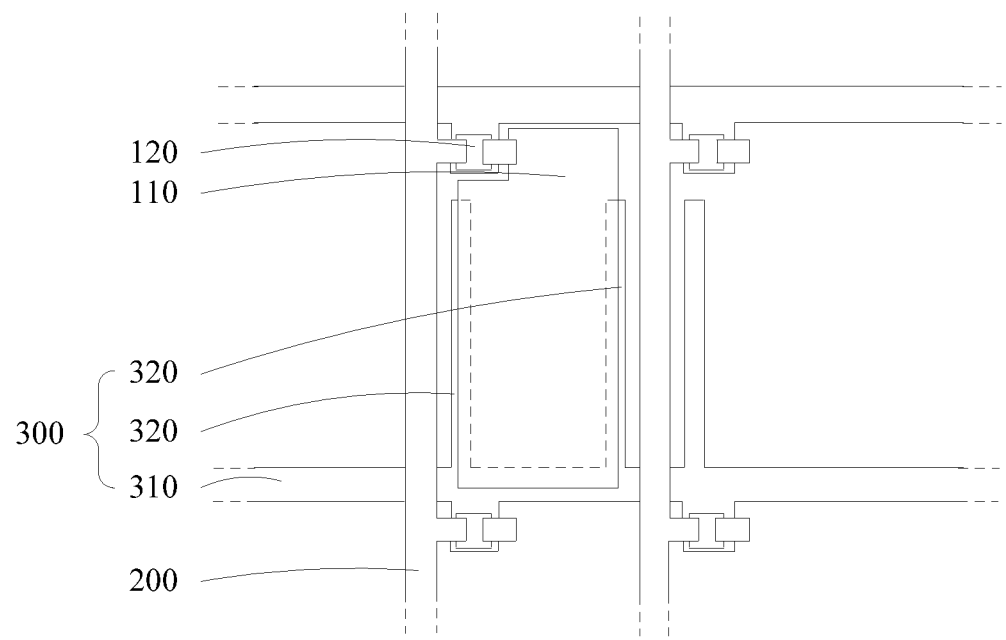
FIG. 14 is a structural diagram according to a further exemplary embodiment of the present disclosure.

In a further exemplary embodiment of the present disclosure, as shown in FIG. 14, the pixel electrode 110 partially overlaps the main scan electrode 310 and the branch scan electrode 320 of the post-stage scan line 300 to form a storage capacitance. In contrast, the pixel electrode 110 overlaps the main scan electrode 310 and the branch scan electrode 320, which helps to increase the storage capacitance and the aperture ratio of the pixel.

Figure 15:
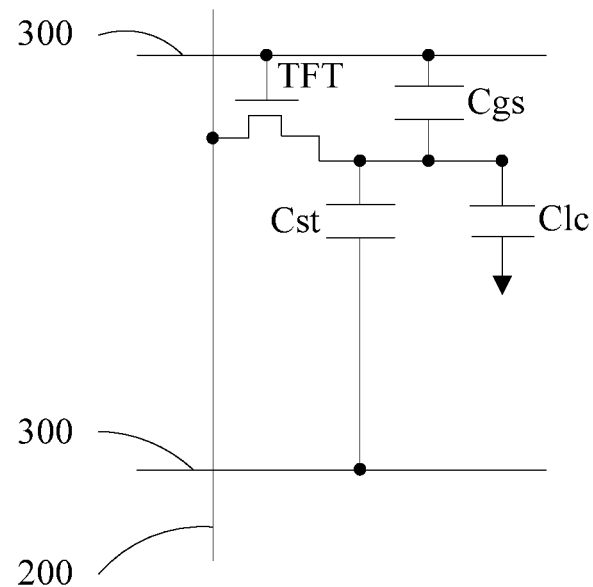
FIG. 15 is a circuit structure diagram of the display panel in FIGS. 13 and 14.
Figure 16:
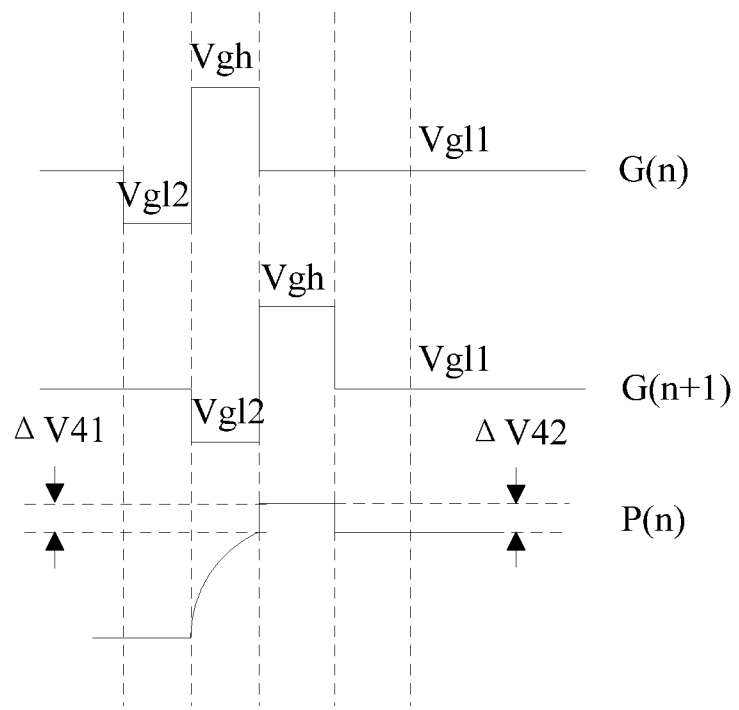
FIG. 16 is a signal timing diagram of the display panel in FIGS. 13 and 14.

As shown in FIG. 15, FIG. 15 is a circuit structure diagram of the display panel in FIGS. 13 and 14. As shown in FIG. 16, FIG. 16 is a signal timing diagram of the display panel in FIGS. 13 and 14. In order to better improve the display effect, it is possible to control the change of pixel level by controlling the timing of scan signals. Specifically, when the display panel is in the operating state, the scan signals on the scan line include a high level Vgh, a first low level Vghl1 and a second low level Vgl2, the high level Vgh1 is higher than the first low level Vgl1, the first low level Vgl1 is higher than the second low level Vgl2, the second low level Vgl2 is located on the rising edge side of the high level Vgh, and the second duration of the second low level Vgl2 is equivalent to the first duration of the high level Vgh, and the high level falling edge of the scan signal G(n) on the current-stage scan line synchronizes with the high level rising edge of the scan signal G(n+1) on the post-stage scan line. When the scan signal G(n) on the current-stage scan line is converted from the high level Vgh to the first low level Vgl1, and the scan signal G(n+1) on the post-stage scan line is converted from the second low level Vgl2 to the high level Vgh, the pixel level change generated on the pixel electrode 110 of the current stage pixel satisfy that $\Delta V41=(Vgh-Vgl1)\times Cgs/(Cgs+Cst+Clc)+(Vgl2-Vgh)\times Cst/(Cgs+Cst+Clc)$, where the first term corresponds to the pixel level change of the current stage scan signal G(n) switching from the high level Vgh to the first low level Vgl1, the second term corresponds to the pixel level change of the post-stage scan signal G(n+1) switching from the second low level Vgl2 to the high level Vgh. When the scan signal G(n+1) on the post-stage scan line is switched from the high level Vgh to the first low level Vgl1, the pixel level change on the pixel electrode 110 of the current stage pixel can be $\Delta V42=(Vgh-Vgl1)\times Cst/(Cgs+Cst+Clc)$. In order to minimize the back flash effect, $\Delta V41$ and $\Delta V42$ should satisfy that $\Delta V41+\Delta V42=0$, i.e. the storage capacitance Cst should satisfy $Cst=(Vgh-Vgl1)\times Cgs/(Vgl1-Vgl2)$. In the exemplary embodiment, the storage capacitance can satisfy the above relationship by changing the overlap area between the pixel electrode 110 and the scan line 300 to achieve a better display effect.

Furthermore, the present disclosure further provides a display device, which includes a display panel, the detail structure of the display panel can be referred to the above embodiments, no need to repeat again.

The foregoing description merely depicts some embodiments of the present application and therefore is not intended to limit the scope of the application. An equivalent structural or flow changes made by using the content of the specification and drawings of the present application, or any direct or indirect applications of the disclosure on any other related fields shall all fall in the scope of the application.

What is claimed is:

1. A display panel, wherein the display panel comprises:
a plurality of data lines;
a plurality of scan lines, each of the scan lines comprises a main scan electrode and a branch scan electrode, the main scan electrode and the branch scan electrode of a same scan line are electrically connected, and at least a part of branch scan electrodes extend along an extending direction of a data line and are adjacent to the data line; and
a plurality of pixels, each of the pixels comprises a pixel electrode, the pixel electrode partially overlaps the branch scan electrode to form a storage capacitance;
wherein the pixel electrode partially overlaps the branch scan electrode and the main scan electrode of a post-stage scan line; the pixel further comprises a switching component, the switching component comprises a source electrode, a drain electrode, and a gate electrode, a parasitic capacitance Cgs is formed between the source electrode and the gate electrode; when the display panel is in an operating state, a scan signal on each of the scan lines comprises a high level Vgh, a first low level Vgl1, and a second low level Vgl2, the high level Vgh is higher than the first low level Vgl1, the first low level Vgl1 is higher than the second low level Vgl2, the second low level Vgl2 is located on a falling edge side of the high level Vgh, and a second duration of the second low level Vgl2 is equivalent to a first duration of the high level Vgh, a high level falling edge of the scan signal on a current-stage scan line synchronizes with a high level rising edge of the scan signal on the post-stage scan line; the storage capacitance Cst satisfies $Cst=(Vgh-Vgl1)\times Cgs/(Vgl1-Vgl2)$.

2. The display panel according to claim 1, wherein the pixel electrode partially overlaps the main scan electrode and the branch scan electrode to form the storage capacitance.

3. The display panel according to claim 2, wherein the pixel electrode partially overlaps two of the branch scan electrodes, and the two branch scan electrodes are respectively defined at two sides of the pixel electrode.

4. A display panel, wherein the display panel comprises:
a plurality of data lines;
a plurality of scan lines, each of the scan lines comprises a main scan electrode and a branch scan electrode, the main scan electrode and the branch scan electrode of a same scan line are electrically connected, and at least a part of branch scan electrodes extend along an extending direction of a data line and are adjacent to the data line; and
a plurality of pixels, each of the pixels comprises a pixel electrode, the pixel electrode partially overlaps the branch scan electrode to form a storage capacitance;
wherein the pixel electrode partially overlaps the main scan electrode and the branch scan electrode to form the storage capacitance;
the pixel electrode partially overlaps the branch scan electrode and the main scan electrode of a fore-stage scan line;
the pixel further comprises a switching component, the switching component comprises a source electrode, a drain electrode, and a gate electrode, a parasitic capacitance Cgs is formed between the source electrode and the gate electrode;
when the display panel is in an operating state, a scan signal on each of the scan lines comprise a high level Vgh, a first low level Vgl1, and a second low level Vgl2, the high level Vgh is higher than the first low level Vgl1, the first low level Vgl1 is higher than the second low level Vgl2, the second low level Vgl2 is located on a falling edge side of the high level Vgh, and a second duration of the second low level Vgl2 is twice of or equivalent to a first duration of the high level Vgh, a high level falling edge of the scan signal on the fore-stage scan line synchronizes with a high level rising edge of the scan signal on the current-stage scan line; the storage capacitance Cst satisfies $Cst=(Vgh-Vgl1)\times Cgs/(Vgl1-Vgl2)$.

5. A display panel, wherein the display panel comprises:
a plurality of data lines;
a plurality of scan lines, each of the scan lines comprises a main scan electrode and a branch scan electrode, the main scan electrode and the branch scan electrode of a same scan line are electrically connected, and at least a part of branch scan electrodes extend along an extending direction of a data line and are adjacent to the data line; and a plurality of pixels, each of the pixels comprises a pixel electrode, the pixel electrode partially overlaps the branch scan electrode to form a storage capacitance;

wherein the pixel electrode partially overlaps the branch scan electrode and the main scan electrode of the fore-stage scan line;

the pixel further comprises a switching component, the switching component comprises a source electrode, a drain electrode, and a gate electrode, a parasitic capacitance Cgs is formed between the source electrode and the gate electrode;

when the display panel is in an operating state, a scan signal on each of the scan lines comprise a high level Vgh, a first low level Vgl1, and a second low level Vgl2, the high level Vgh is higher than the first low level Vgl1, the first low level Vgl1 is higher than the second low level Vgl2, the second low level Vgl2 is located on a falling edge side of the high level Vgh, and a second duration of the second low level Vgl2 is twice of or equivalent to a first duration of the high level Vgh, a high level falling edge of the scan signal on the fore-stage scan line synchronizes with a high level rising edge of the scan signal on the current-stage scan line; the storage capacitance Cst satisfies Cst=(Vgh−Vgl1)×Cgs/(Vgl1−Vgl2).

* * * * *